May 28, 1963 A. W. DONKIN 3,091,447

SPRING

Filed April 19, 1961

INVENTOR.
ARTHUR W. DONKIN
BY Gary, Desmond & Parker
ATTYS.

United States Patent Office 3,091,447
Patented May 28, 1963

3,091,447
SPRING
Arthur W. Donkin, Chicago, Ill., assignor to Convo-Trol, Inc., Chicago, Ill., a corporation of Delaware
Filed Apr. 19, 1961, Ser. No. 104,179
10 Claims. (Cl. 267—1)

This invention relates to improvements in springs, and more particularly to springs comprising a length of resilient metal stock in coil form having coplanar inner, outer and intermediate convolutions, this spring being designed to yieldably resist torque loads.

Springs of this type have many uses in the mechanical arts and are now commonly provided to counterbalance various structures such as the hoods, trunk doors, and windows of automobiles, and other similar uses.

Springs heretofore provided for such uses have been of the spiral type in which a length of flat, hardened steel strips is spirally wound to follow a curve having a constantly increasing radius of curvature, with the spacing of adjacent convolutions of the spring progressively increasing from the inner end toward the outer end thereof.

It has also heretofore been proposed to eccentrically dispose the adjacent convolutions with respect to each other and to dispose them with adjacent convolutions normally in abutting or substantial abutting engagement in a radial line at one side of the spring, with the object in view of preventing frictional binding engagement of adjacent convolutions during application of normal torque loads on the spring.

In the use of a torque spring of the type herein contemplated, to for example counterbalance the window of an automobile, the several convolutions of the spring are moved radially into frictional engagement with each other during opening movement of the window, thereby causing a binding action between adjacent convolutions and objectionable vibration, chattering noises and shock loads. To reduce such binding action, it has been common practice to apply grease to the several convolutions of the spring during assembly of automobiles, but it is well known in this art that the grease is, within a relatively short period of use, squeezed out from between the convolutions and cannot be readily replaced.

Even with the proposal aforesaid, to dispose the convolutions in an eccentric manner, with greatest proximity on a radial line, binding between adjacent coils occurred at less than 180° angular deflection of the inner end of the coil.

As distinguished from this, present-day automotive requirements are such as to require 200–300° of angular rotation at maximum output, and it is therefore manifestly desirable that a coil spring of the class herein contemplated be provided which can be wound by rotating the inner terminal end through an angle of at least 180° or more without undue binding of the adjacent convolutions when the torque load is applied under operative conditions.

It is therefore an object of the present invention to provide a coil spring effective to yieldably resist torque loads without causing a binding or undue binding action between adjacent convolutions of the spring when the spring is wound by rotating the inner terminal end through an angle of at least or greater than 180°.

More specifically, it is an object of the present invention to provide a coil spring wherein the adjacent convolutions are arranged eccentrically in a novel manner whereby adjacent convolutions are adapted to remain out of contact or substantially out of contact with each other when a torque load is applied so as to deflect the inner end of the spring at an angle of 225–230°, which is thus adequate to permit deflection to even up to 300° without objectionable binding action.

The foregoing object of the present invention is in general accomplished by disposing the adjacent coils eccentrically to each other in a manner whereby their greatest points of proximity lie substantially on an involute curve having its inception in the inner coil and opening toward the outermost coil in a direction in which the spring is adapted to be wound or in which the moment is applied.

A further object of the present invention relates to the provision of a two contact point staking arrangement at the outer terminal of this spring as an aid in enhancing the nonbinding properties of the spring upon application of a torque load.

A further object relates to means for enhancing the nonbinding properties of the spring by disposing a fixed support or fulcrum means adjacent to but spaced from the outer end of the spring and disposed inwardly of the outermost convolution.

Other objects of the invention relate to its details of construction and arrangement of parts which will be apparent from a consideration of the following specification and accompanying drawings, wherein.

Figure 1:
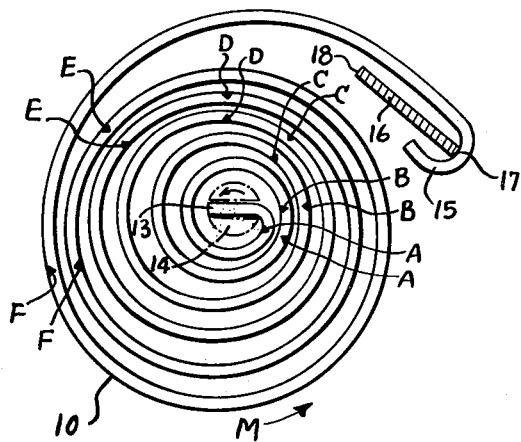
FIG. 1 is a plan view illustrating a spring embodying the features of the present invention while at rest or before a load has been applied thereto.
Figure 3:
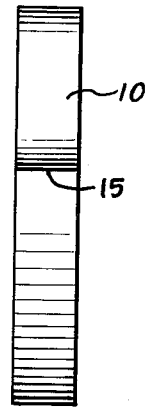
FIG. 3 is a side elevational view of a spring made in accordance with the present invention of flat strip stock.

Referring to the drawings, the spring of the present invention is shown as comprising, for the purpose of illustration, a length of resilient strip metal in wound or coiled form to provide a plurality of coplanar convolutions comprising an outer convolution 10, an inner convolution 11 and a plurality of intermediate convolutions 12, the innermost convolution terminating in an end portion 13 which as shown here extends radially so as to be received in the slotted end of the rotatable shaft or spindle 14, whereby the spring is adapted to be wound on the application of a torque load.

Figure 2:
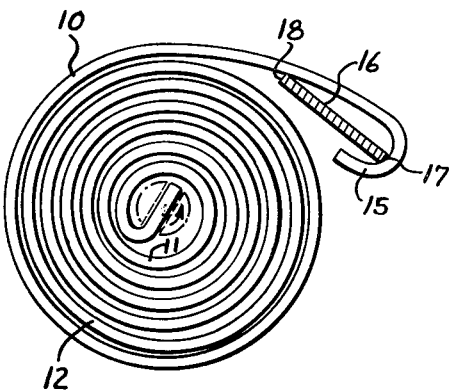
FIG. 2 is a plan view showing the relative positions of the several convolutions of the spring after a torque load has been applied thereto, such as to deflect or rotate the inner end of the spring through an angle of 230°.

The outer convolution 10 of the spring terminates in a return-bent hook-shaped portion 15 which in FIGS. 1 and 2 is shown to be bent inwardly, whereat it is freely anchored about the member 16. This member 16 is here shown to be in the form of an elongated bar to provide two opposed end portions, the end 17 providing an anchor or abutment portion for the hook 15 and an end 18 providing a fixed fulcrum, particularly when a torque load is applied and the spring wound up as shown in FIG. 2. Although a single elongated bar 16 is employed, it will be understood that two separate fixed members can be employed in lieu thereof for providing (a) an anchor and (b) a fulcrum for the outer terminal end portion of the spring as shown in FIGS. 1 and 2.

Figure 4:
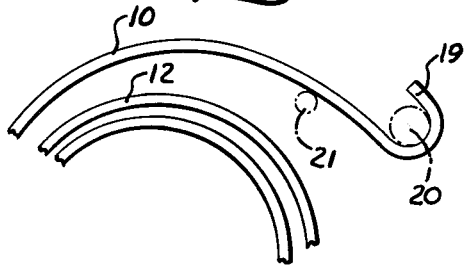
FIG. 4 is a fragmentary plan view of a spring formed in accordance with the present invention but having a modified outer end terminal construction and arrangement.

The modified form of spring shown in FIG. 4 has a conventional outwardly return-bent terminal hook portion 19 for anchoring engagement about a fixed anchor 20. In this instance a separate fixed fulcrum member 21 is disposed inwardly of the outermost coil 10 and spaced from the fixed anchor 20.

As will appear from FIG. 1, the adjacent convolutions are disposed eccentrically with respect to each other and the centermost convolution, and are further arranged in a manner so that their points of greatest proximity or tendency to touch when the spring is unloaded is on an involute curve having its inception at the innermost convolution, preferably on the inner periphery thereof, and opening toward the outermost convolution in a direction in which the spring is adapted to be wound when angularly rotating said inner convolution, these points of closest proximity between adjacent coils being indicated in the illustration of FIG. 1 by the successive points A,A, B,B, C,C, D,D, E,E, and F,F.

The arrangement may be compared to a curve generated by the end of a spring which is kept taut while being unwound from a circle, the circle about which the curve is generated is the inner periphery of the first convolution 11 of the spring, and it will be noted from FIG. 2 that the adjacent convolutions are still free from one another after a 225–230° deflection.

I believe that some open coil or non-coil interference effect is attributable to the two contact point staking arrangement effected by the flat bar 16 disposed so as to provide two spaced fixed components, one an anchor lying within the bottom of the hook 17 and the other a fulcrum point spaced inwardly therefrom. Likewise, the same effect is accomplished by the arrangement of FIG. 4 wherein the hook 19 extends outwardly but two spaced fixed members are employed, one an anchor lying within the base of the hook 19 and another spaced therefrom and disposed inwardly of the outer end of the outermost coil 10, the arrangements of the fulcrum means apparently causing a countertorque to be introduced.

The spring of the present invention is suitably formed from a length of unhardened steel stock and then hardened by conventional heat treatment to provide the desired physical properties and to set the arrangement of adjacent coils in the manner aforesaid.

I claim:

1. A coil spring, the adjacent coils thereof, when unwound, lying eccentric to each other and having points of closest proximity and circumferentially spaced points of maximum spacing with the points of closest proximity disposed substantially on an involute curve having its inception at the innermost coil and opening toward the outermost coil in a direction in which the spring is adapted to be wound from its inner end.

2. A coil spring, the adjacent coils thereof, when unwound, lying eccentric to each other and having points of closest proximity and circumferentially spaced points of maximum spacing with the points of closest proximity disposed substantially on an involute curve having its inception at the innermost coil and opening toward the outermost coil in a direction in which the spring is adapted to be wound from its inner end, said coils being adapted to be brought into substantially concentric relationship and to remain out of contact with each other when the spring is wound by rotating the inner terminal end through an angle of at least 180°.

3. A spring comprising a length of resilient metal stock in coil form having coplanar inner, outer and intermediate convolutions, an inner terminal end portion adapted to be secured to a spindle, and an outer terminal hook-shaped portion adapted to be engaged about a relatively fixed member, the adjacent convolutions being disposed eccentric to each other, when the spring is unloaded, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion.

4. A spring comprising a length of resilient metal stock in coil form having coplanar inner, outer and intermediate convolutions, an inner terminal end portion adapted to be secured to a spindle, and an outer terminal hook-shaped portion adapted to be engaged about a relatively fixed member, the adjacent convolutions being disposed eccentric to each other, when the spring is unloaded, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion, said convolutions being adapted to remain out of contact with each other when the spring is wound in said manner to an angle of 225–230° against said fixed member and about a fixed fulcrum means disposed within said outermost convolution adjacent to but spaced from the bend of said hook.

5. A spring comprising a length of resilient metal stock in coil form having coplanar inner, outer and intermediate convolutions, an inner terminal end portion adapted to be secured to a spindle, and an outer terminal and inwardly return-bent hook-shaped portion adapted to be engaged about a relatively fixed member, the adjacent convolutions being disposed eccentric to each other, when the spring is unloaded, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion.

6. A spring comprising a length of resilient metal stock in coil form having coplanar inner, outer and intermediate convolutions, an inner terminal end portion, a spindle engaged to the latter, an outer hook-shaped terminal spring portion, a fixed member engaged by said outer terminal portion, the adjacent convolutions being disposed eccentric to each other, when the spring is unloaded, and having points of closest proximity and circumferentially spaced points of maximum spacing with the points of closest proximity disposed in an involute curve having its inception at the innermost convolution and opening toward the outermost convolution in a direction in which the spring is adapted to be wound by angularly rotating said inner end portion.

7. A spring comprising a length of resilient metal stock in coil form having coplanar inner, outer and intermediate convolutions, an inner terminal end portion, a spindle engaged to the latter, an outer hook-shaped terminal spring portion, a fixed member engaged by said outer terminal portion, the adjacent convolutions being disposed eccentric to each other, when the spring is unloaded, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion, and a fixed fulcrum means disposed within said outermost convolution adjacent to but spaced from the terminal end of said hook.

8. A spring comprising a length of resilient metal stock in coil form having coplanar inner, outer and intermediate convolutions, an inner terminal radially extending spring portion and a rotatable shaft engaged thereto, an outer and outwardly return-bent hook shaped terminal spring portion and a fixed member freely engaged thereby, and fixed fulcrum means disposed against and within said outermost convolution adjacent to but spaced from the fixed member within the hook, the adjacent convolutions being disposed eccentric to each other, when the spring is unloaded, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion.

9. A spring comprising a length of resilient metal stock in coil form having coplanar inner, outer and intermediate convolutions, an inner terminal radially extending spring portion and a rotatable shaft engaged thereto, an outer and inwardly return-bent hook-shaped terminal spring portion and a fixed anchor component freely engaged thereby, and a fixed fulcrum component disposed against and within said outermost convolution adjacent to but spaced from said first fixed component, the adjacent convolutions being disposed eccentric to each other, when the spring is unlocked, and having points of closest proximity and circumferentially spaced points of maximum spacing with the points of closest proximity disposed on an involute curve having its inception at the innermost convolution and opening toward the outermost convolution in a direction in which the spring is adapted to be wound by angularly rotating said inner end portion.

10. The structure of claim 9 where said fixed anchor and fulcrum components are opposed end portions of an elongated bar.

References Cited in the file of this patent

UNITED STATES PATENTS

| | | |
|---|---|---|
| 1,365,701 | Kliesrath et al. | Jan. 18, 1921 |
| 2,535,515 | Repass | Dec. 26, 1950 |
| 2,627,401 | Harada | Feb. 3, 1953 |
| 2,821,379 | Donkin et al. | Jan. 28, 1958 |